United States Patent [19]

Moles et al.

[11] Patent Number: 4,636,841

[45] Date of Patent: Jan. 13, 1987

[54] FIELD COMB FOR LUMINANCE SEPARATION OF NTSC SIGNALS

[75] Inventors: Warren H. Moles, Flemington; Robert A. Dischert, Burlington Township, Burlington County both of N.J.

[73] Assignee: RCA Corporation, Princeton, N.J.

[21] Appl. No.: 736,968

[22] Filed: May 22, 1985

Related U.S. Application Data

[63] Continuation-in-part of Ser. No. 615,544, May 31, 1984, abandoned.

[51] Int. Cl.⁴ ............................................. H04N 9/64
[52] U.S. Cl. ......................................... 358/31; 358/36
[58] Field of Search ................. 358/31, 36, 37, 166, 358/167

[56] References Cited

U.S. PATENT DOCUMENTS

| | | | |
|---|---|---|---|
| 4,348,689 | 9/1982 | Achiha | 358/31 |
| 4,498,099 | 2/1985 | Pritchard | 358/31 |
| 4,550,340 | 10/1985 | Nicholson | 358/31 |
| 4,553,158 | 11/1985 | Acampora | 358/31 |
| 4,555,723 | 11/1985 | Pritchard | 358/31 |
| 4,597,007 | 6/1986 | Reitmeier | 358/31 |

FOREIGN PATENT DOCUMENTS

| | | | |
|---|---|---|---|
| 58-161484 | 9/1983 | Japan | 358/31 |
| 2072991 | 3/1981 | United Kingdom . | |

OTHER PUBLICATIONS

D. H. Pritchard, "A CCD Comb Filter for Color TV Receiver Picture Enhancement", RCA Review, vol. 41, Mar. 1980, pp. 3–28.

*Primary Examiner*—Michael A. Masinick
*Attorney, Agent, or Firm*—E. M. Whitacre; P. J. Rasmussen; E. P. Herrmann

[57] ABSTRACT

A field comb filter for separating luminance signal from NTSC composite video additively combines signals separated by 263 horizontal lines. Vertical detail is restored and motion compensation provided by subtractively combining signal separated by 262 horizontal lines and adding the difference to the separated luminance signal.

13 Claims, 9 Drawing Figures

4,636,841

FIELD COMB FOR LUMINANCE SEPARATION OF NTSC SIGNALS

This is a continuation-in-part of application Ser. No. 615,544, filed May 31, 1984, now abandoned.

BACKGROUND OF THE INVENTION

This invention relates to circuitry for separating chrominance and luminance components from composite video signal, and more particularly to a comb filter utilizing a one field delay and incorporating circuitry to compensate for motion induced artifacts.

The use of comb filters for separating luminance and chrominance is well known by those skilled in the art of video processing. Hardware cost restraints, however, have generally limited their implementation to relatively simple interline comb filters (a description of an interline comb filter may be found in RCA Review, Vol. 41, No. 1, March 1980, pp. 3-28, in the article by D. H. Pritchard, entitled "A CCD Comb Filger for Color TV Receiver Picture Enhancement", which is incorporated herein by reference).

Interline comb filters effectively separate chrominance and luminance components but produce several undesirable effects. These effects include: loss of diagonal resolution; reduction of vertical resolution; and the production of "hanging dots" along vertical transitions.

Interframe comb filters which operate on signals separated by integral video frame intervals separate chrominance and luminance components without any of the foregoing undesirable effects. However, interframe comb filters generate extremely annoying artifacts around the edges of moving image objects. To overcome this shortcomming it has been proposed to utilize adaptive comb filters. One such adaptive filter combines a line comb filter with a frame comb filter. In this arrangement, separated luminance and chrominance is acquired from the line comb filter during intervals of interimage motion and from the frame comb filter in the absence of motion. Adaptive systems, though producing generally improved signals, are costly to realize and have compromised performance.

The present invention is a comb filter system which is generally superior to the interline comb filter or the adaptive interframe comb filter but requires significantly less hardware than the interframe comb filter.

SUMMARY OF THE INVENTION

The present invention consists of an interfield comb filter for separating luminance signal from composite video and an interline comb filter for separating chrominance signal from composite video. A luminance motion compensation signal is derived by subtracting in phase composite signals separated by e.g. 262 lines. This compensation signal is combined with the comb filtered luminance signal to produce a luminance signal without significant motion induced artifacts and only marginally noticeable hanging dots.

DETAILED DESCRIPTION

Figure 1A:
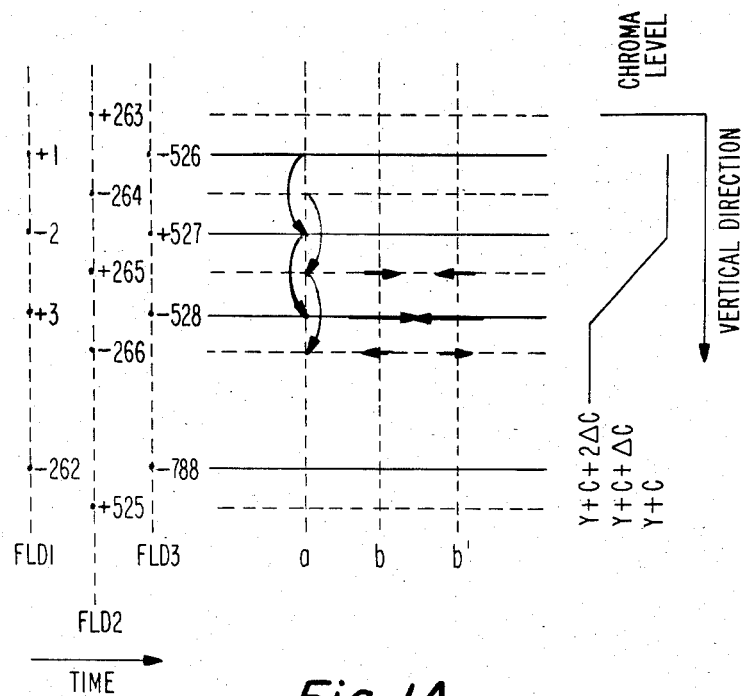
FIGS. 1A and 1B are schematic representations of a reproduced image and which indicates particular horizontal lines involved in line comb filters and field comb filters.

Referring to FIG. 1A, the center portion of the drawing represents the scan lines of an interlaced raster scanned image. The solid horizontal lines are the scan lines of the odd fields and the intervening broken lines represent the scan lines of even fields. At the left edge of the drawing are three columns of numbers designating the scan lines for three successive fields. The ($\pm$) signs associated with the line numbers indicate the relative phase of the chrominance signal associated with each line. It will be readily appreciated by those skilled in the art of video systems that one field of conventional NTSC signal includes $262\frac{1}{2}$ lines. Every second field begins with a half line (latter half) while intervening fields end with a half line (beginning half). Signals delayed by one field period plus or minus a half line period correspond to vertically aligned samples, and are located on adjacent interlaced lines. In the NTSC system, signal samples separated by 262 lines have an in phase chrominance subcarrier relationship while signal samples separated by 263 lines have chrominance subcarrier relationship that is 180 degrees out of phase.

To the right of the drawing is a waveform depicting a change in chrominance amplitude meant to illustrate a vertical transition which spans the picture width, i.e. a horizontal color edge in the displayed image. The transition represents the fastest chrominance signal change that can occur due to the effective sampling rate (in the vertical direction) of conventional raster scan video cameras.

The curved arrows along the vertical column designated "a" designate the horizontal lines of signal that are additively combined to produce line comb filtered luminance signal. The curved arrows to the left of column "a" designate the lines in the odd fields that are combined, and the curved arrows to the right of column "a" indicate the lines that are combined in even fields. For example, in the odd fields, line 1 is added to line 2 to produce luminance signal corresponding to displayed line 2. Line 2 is added to line 3 to produce luminance signal corresponding to displayed line 3, etc.

During vertical chrominance transitions the chrominance signal is not completely cancelled from the comb filtered luminance signal. The residual chrominance signal in the comb filtered luminance generates what is known as "hanging dots" along horizontal edges. Note from FIG. 1 if lines 264 and 265 are averaged the result is $Y+\Delta C/2$ where Y represents luminance signal and $\Delta C$ is the change in chrominance signal between lines 264 and 265. The term $\Delta C/2$ is undesired residual chrominance signal. Similarly, if lines 2 and 3 are added and the sum divided by two, the resultant signal is $Y+\Delta C$ where the term $\Delta C$ is undesired residual chrominance signal. The residual chrominance values are indicated graphically by the horizontal arrows along the vertical dashed line b. The length of the arrow indicates the relative amplitude of the residual chrominance associated with the respective line of comb filtered signal. Rightward pointing arrows designate residual chrominance having the same relative polarity as the chrominance transition, and leftward pointing arrows are of opposite polarity. Vertical line b' occurs at a point in space corresponding to a half cycle of the chrominance subcarrier from point b. The chrominance signal at point b' is 180 degrees out of phase with the chrominance signal at point b. As a consequence, the polarity of residual chrominance in the comb filter luminance signal (for like chrominance transitions) along vertical line b' is opposite to that along dashed line b. Since the residual chrominance linearly adds/subtracts from the luminance signal, it is seen that along a horizontal color image edge, the residual chrominance tends to drive the luminance amplitude alternately toward white and black levels at alternate half cycles of the chrominance signal. It can also be seen that for a color transition occurring between two lines, residual chrominance is found in three lines of the line comb filtered luminance signal.

Figure 1B:
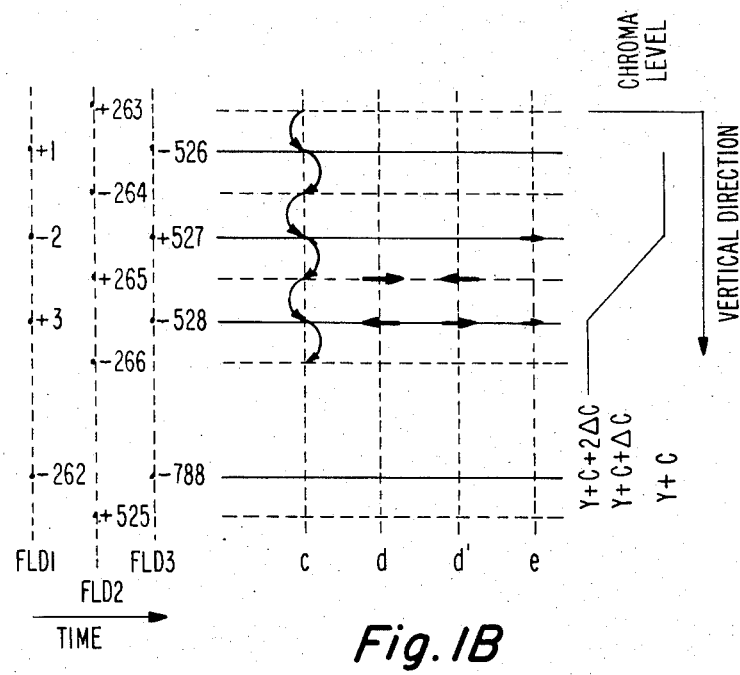

Next consider FIG. 1B which is similar to FIG. 1A except that it depicts using adjacent interlaced lines in a comb filter system. The curved arrows to the left of the dashed vertical "C" indicate the horizontal lines of signal combined during a first field of a field comb filtered luminance signal and the curved arrows to the right of vertical "C" indicate the horizontal lines used in the next successive field of comb filtered signals. The luminance comb filtered samples are the average values of samples from two successive fields. Spatially the samples are one-half line apart, i.e. they are separated by one-half the vertical distance that samples combined in a line comb filter are separated. Due to the inherent bandwidth limitations, the amplitude of chrominance changes are necessarily less than the amplitude of a chrominance transition between lines in a single field. This results in the maximum amplitude of residual chrominance contaminating the comb filtered luminance signal being less for interfield comb filtered signals than interline comb filtered signals for the same chrominance transition.

The arrows along vertical lines "d" and "d'" represent the residual chrominance signal in a field comb filtered luminance signal for the chrominance signal illustrated at the right side of the drawing. The occurrence of residual chrominance is restricted to two lines and the maximum amplitude is one-half the maximum amplitude exhibited in the line combed signals. In addition, the polarity of the residual chrominance signal is opposite on adjacent lines. These three features dramatically reduce the observability of "hanging dots" in field combed luminance signals. The one polarity residual chrominance on one line tends to brighten the picture while the opposite polarity residual chrominance on the adjacent interlaced line tends to darken the picture. The two points are close enough that the eye integrates the brightness over the picture are tending not to recognize the hanging dot.

As in line comb filters, there is an inherent loss in vertical detail in the field combed luminance signal, i.e. for any comb filtered line the luminance signal is the averaged luminance signal over e.g. two lines. Thus, if from line 2 in field 1 to line 265 in field 2 the luminance signal, Y, changes by an amount $\Delta Y$, the effective change in the field combed luminance signal is $\Delta Y/2$. To restore the comb filtered signal a value $\Delta Y/2$ must be added back to produce the true luminance transition.

Observing the left side of FIG. 1B, and assuming the comb filtered luminance signal is derived from adding lines 2 and 265, over which lines a luminance transition is presumed to have occured in the vertical direction, it will be noted that the same transition occurs between lines 265 and 527. Lines 265 and 527 have the same phase chrominance signal, thus, subtracting one from the other will generate a signal corresponding to the luminance transition. Halving this signal produces the desired vertical detail for addition back into the comb filtered luminance signal. Note, however, that a system operating simultaneously on lines 2, 265 and 527 to produce a comb filtered signal requires two fields of storage. An alternative approach where only one field of storage is available is to combine the closest in-phase lines adjacent the lines utilized in the comb filter. Where lines 2 and 265 are averaged to produce comb filtered luminance the appropriate in-phase lines for developing a difference signal are lines 265 and 3. If the luminance transition spans several lines and is generally monotonic, this difference signal will be exact, and this is generally the case. Note also that if image motion exists between fields, this motion information will also be included in the difference signal. Adding this motion information back into the combed luminance signal tends to correct artifacts attendant field combed images.

It will be appreciated by those skilled in the art of video comb filters that the difference signal will contain not only luminance vertical detail and luminance motion detail, but also chrominance motion and vertical detail information. It would therefore appear to be desirable to low pass filter the difference signal to eliminate the chrominance components before adding it to the combed luminance signal. In fact, there is a trade off to be made. If the chrominance component is filtered out of the difference signal, the "hanging dots" are less apparent but the edges of objects moving rapidly horizontally are less well defined. Thus, there is a choice between hanging dots or horizontal motion detail. Referring again to FIG. 1B, the arrows along the vertical line "e" designate the residual chrominance in the comb filtered luminance signal with a wide band difference signal added back. This residual chrominance tends to produce "hanging dots" but they are significantly less apparent than for interline comb filtered signal. The residual chrominance is worse only for sharp chrominance transitions. For transitions that span several lines the residual chrominance is in general improved.

Figure 2:
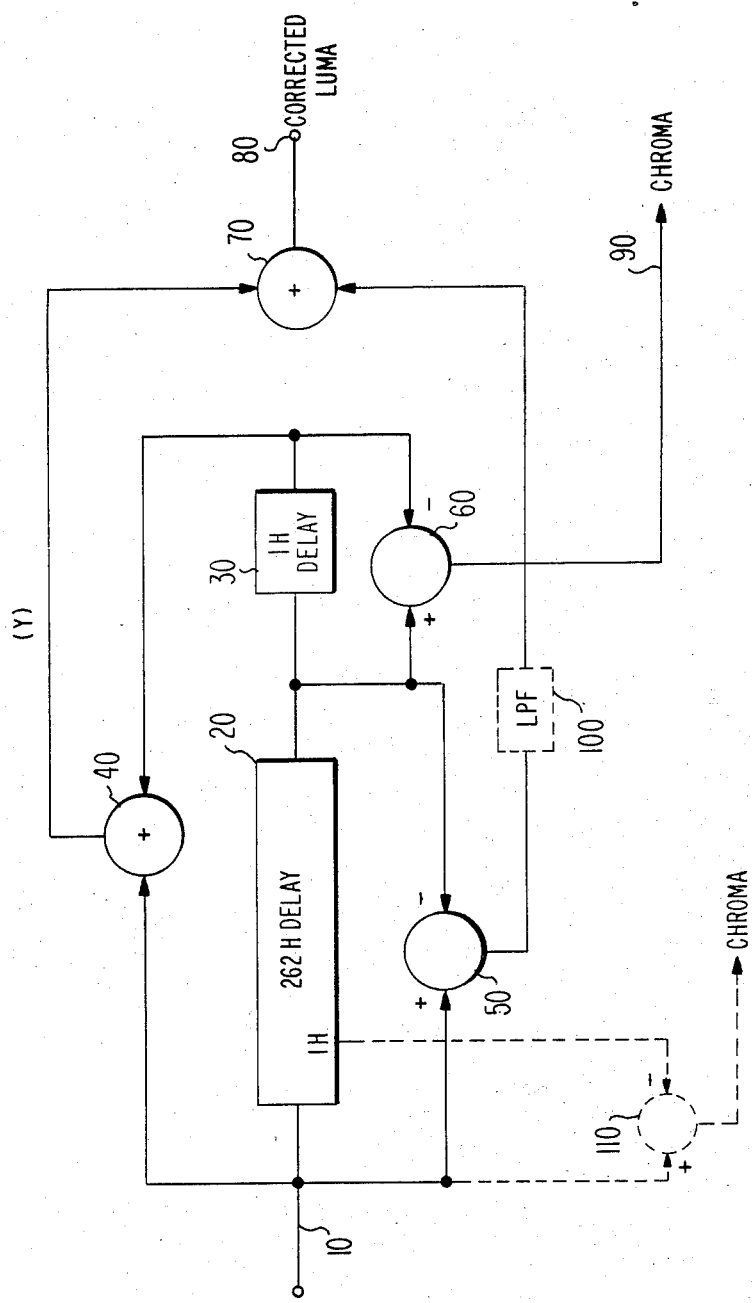
FIGS. 2, 3, 4, 5 and 7 are block diagrams of interfield luminance comb filters embodying the present invention.

FIG. 2 is a block diagram of circuitry for performing the above-described field comb filtering to produce motion corrected separated luminance signal from composite video. The circuitry may be realized with digital or analog devices depending on the signal to be processed.

In FIG. 2 baseband composite video is applied to input terminal 10 from which it is routed to the input ports of a 262 line delay element 20, a signal adder 40 and a signal subtractor 50. Delay element 20 delays signal applied thereto by 262 horizontal video line periods. The delayed signal from delay element 20 is applied to a further delay element 30 which delays signal by one horizontal video line period. The delayed signal from element 20 is also applied to respective input ports of the signal subtractors 50 and 60. Delayed signal from delay element 30 is applied to respective input ports of signal adder 40 and signal subtractor 60. Finally the signal sums from adder 40 and the signal differences from subtractor 50 are applied to respective input ports of the signal adder 70. The output, 80, of adder 70 is comb filtered, motion corrected luminance signal. The output, 90, of subtractor 60 is line combed chrominance signal.

Consider that signal from horizontal line n is present at the output of delay element 30. The signal at the input to element 30 therefore corresponds to line n+1. Lines n and n+1 being successive lines, their chrominance components are 180 degrees out of phase. Line n being subtracted from line n+1 in subtractor 60 cancels the luminance component of the applied video signal and produces a chrominance signal of twice amplitude which will be subsequently halved for further chrominance processing.

If the output signal from delay element 20 is line n+1 then the input to element 20 is line n+263. Lines n and n+263 are summed in adder 40. Note that if n is an odd number, then n+263 is an even number. For NTSC signal, odd numbered lines all have the same phase chrominance subcarrier and even numbered lines have the opposite phase subcarrier. Lines n and n+263 are separated by 263 lines or one field period plus a half line period (for NTSC signal). Adding the even and odd numbered lines in adder 40 cancels the chrominance component and produces separated luminance signal (with residual chrominance at chrominance transitions, lacking a portion of vertical luminance detail, and including artifacts due to interfield motion).

Lines n+1 and n+263 are applied to subtractor 50. These lines ae either both odd or both even, thus they have the same chrominance phase. These lines are separated by a full field period less a half line period. Line n+1 is subtracted from line n+263 to generate a difference signal which includes vertical detail and motion information which is reinserted into the combed luminance signal by adder 70. With respect to the luminance signal the algorithm performed by the FIG. 2 circuit may be described by the equation:

$$YW = S_{n+263} + S_n + (S_{n+263} - S_{n+1}) \quad (1)$$

where Y is the signal produced at output port 80 and $S_i$ is signal from line i where "i" is an integer and an index number.

As indicated before, it may be preferred to low pass filter the difference signal before reinsertion into the luminance signal. This is indicated by the element 100 in phantom coupled between elements 50 and 70. If such an element 100 is incorporated in the circuitry, then it may be required to insert a delay element between elements 40 and 70 to compensate for inherent signal delays in element 100.

For convenience, the interline chrominance comb filter is shown utilizing the one line delay element 30. An alternative chrominance comb filter is shown in phantom including the subtractor 110. In this alternative, signal delayed by one line is tapped from delay element 20 and subtracted in subtractor 110 from signal applied at input terminal 10. Note that using this alternative chrominance comb, the comb filtered luminance, the difference signal and the comb filtered chrominance all have contributions from line n+263.

The FIG. 2 circuitry corrects motion induced luminance changes. The systems of FIGS. 3, 4 and 5 include circuitry to preclude chrominance contamination of the comb filtered luminance signal due to motion induced chrominance changes. In so doing, however, high frequency motion induced luminance artifacts may be exacerbated. In general, this does not introduce significant noticeable artifacts because motion frequencies are limited by the sampling rate of the video signal source, e.g. the field rate of video cameras.

Figure 3:
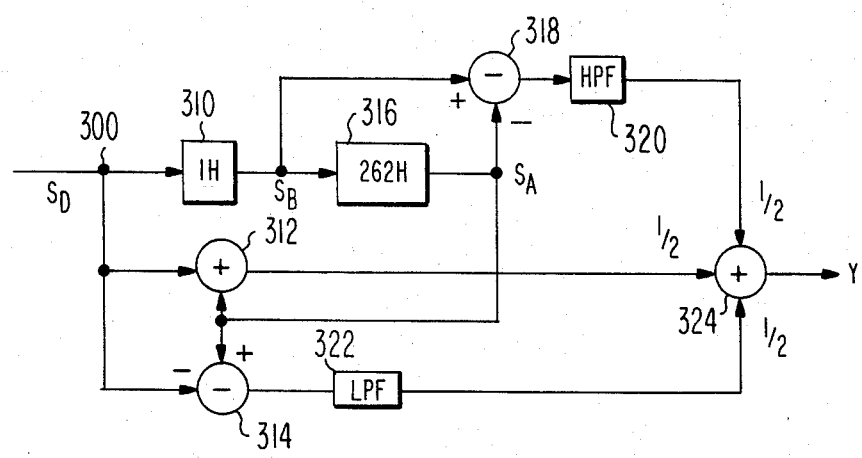

The circuitry of FIG. 3 develops a low frequency luminance compensation signal which precisely eliminates low frequency motion induced luminance artifacts. The chrominance correction signal, on the other hand, is developed similarly to the luminance correction signal developed by the FIG. 2 circuit.

In FIG. 3 composite video signal is applied at terminal 300. This signal is coupled to the cascade connected delay elements 310 and 316 which provide composite video signals delayed by one and 263 horizontal line periods respectively. Input signal from port 300 and delayed signal from delay element 316 are applied to adder 312 which produces uncorrected luminance signal at its output. Input signal from port 300 and delayed signal from delay element 316 are applied to subtracter 314 which produces the differences between these two signals. The higher frequency components of this difference signal corresponds to the chrominance component of the input composite video signal plus high frequency luminance differences. The lower frequency components of the difference signal from subtractor 314 consists of the luminance differences between successive fields whether due to motion induced changes or line-to-line image differences.

Let the input signal and the delayed signals from delay elements 310 and 316 be designated $S_D$, $S_B$ and $S_A$ respectively. In addition, assume that the output luminance signal Y corresponds in time to signal $S_A$. Further, assume that the amplitude of signal $S_A$ is equal to $S_A$ and that the signal $S_D$ is equal to $S_A$ plus a motion induced difference $S_{AM}$ and a scene related difference $S_{AS}$. Ignoring the chrominance component, the outputs $S_{ADD}$ and $S_{SUB}$ from adder 312 and subtracter 314, respectively are given by $$S_{ADD} = S_A + (S_A + S_{AM} + S_{AS}) \quad (2)$$

$$S_{SUB} = S_A - (S_A + S_{AM} + S_{AS}) \quad (3)$$

If signals $S_{ADD}$ and $S_{SUB}$ are scaled by one-half and additively combined, the result is $S_A$ which is equal to the luminance component at the output of delay element 316. Returning to FIG. 3, the output of subtractor 314 is filtered in filter 322 to reject the band of frequencies containing chrominance, scaled by one-half and applied to adder 324. The output of adder 312 is also scaled by one-half and applied to adder 324. The contributions of these two signals provide a correct low frequency luminance component at Y. (Note scaling circuits have not been included in the drawing since for analog signals scaling may be performed in the adder 324, and for digital signals scaling by one-half may be accomplished by changing the signal bit significance via wiring.)

A chrominance motion correction signal is generated from subtracter 318 and filter 320 which attenuates that portion of the composite video signal spectrum not normally occupied by the chrominance component. Subtracter 318 produces the differences between signals delayed by delay elements 310 and 316. In forming these differences it is important that signal delayed by 263 line periods be subtracted from signal delayed by one line period.

The phase of the chrominance component of signals $S_B$ and $S_A$ is the same and is 180 degrees out of phase with the chrominance component of signal $S_D$. Assume that the amplitude of the chrominance signals $S_A$ is equal to $S_A$. Since signals $S_D$ and $S_B$ are from the same field, assume that they have equal magnitudes equal to $S_A$ plus a change $S_{AM}$ due to motion between fields. Thus, the chrominance component of signal $S_B$ equals $S_A + S_{AM}$ and the chrominance component of signal $S_D$ equals $-(S_A + S_{AM})$. The chrominance components, $S_{ADDC}$ and $S_{SUBC}$, provided by adder 312 and subtracter 318 are:

$$S_{ADDC} = S_A - (S_A + S_{AM}) = -S_{AM} \quad (4)$$

$$S_{SUBC} = (S_A + S_{AM}) - S_A = S_{AM}. \quad (5)$$

If these signals are additively combined, the motion induced chrominance difference $S_{AM}$ will cancel.

The difference signal from subtracter 318 is applied to filter 320 which passes the chrominance signal spectrum of the difference signals. The output of filter 320 is scaled by one-half and applied to adder 324, where it is summed with the signals from adder 312 and subtracter 314. Adder 324 produces normalized luminance signal Y with low frequency luminance components precisely compensated for moton and with motion induced chrominance contamination eliminated.

Figure 4:
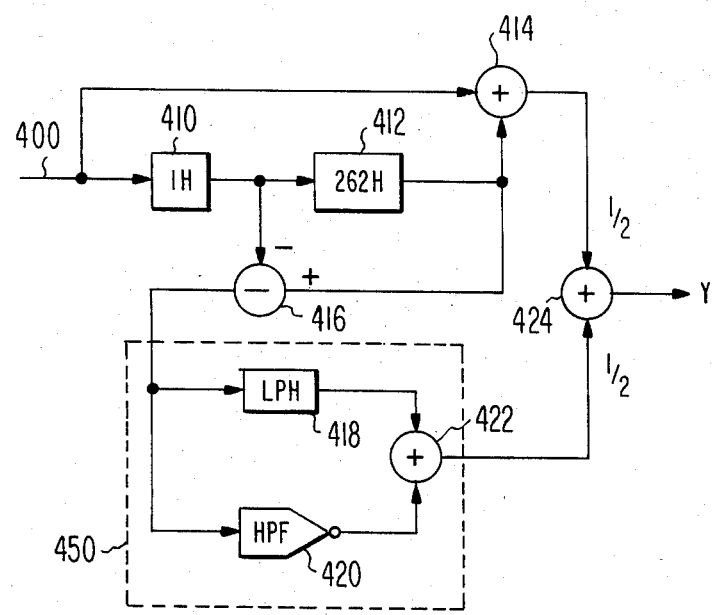

FIG. 4 is a variant of the FIG. 2 arrangement and includes means for cancelling motion induced chrominance contamination. In FIG. 4, the cascade connection of the 1H and 262H delay elements is reversed relative to the FIG. 2 embodiment, but this is of no significance. The operation of elements 410, 412, 414, 424, 416 and 418 of FIG. 4 is similar to the operation of elements 30, 20, 40, 70, 50 and 100 of FIG. 2 respectively. As such, these elements provide motion corrected low frequency luminance. In FIG. 4, a filter 420 and adder 422 have been added to provide a cancellation signal for eliminating motion induced chrominance contamination from the luminance signal provided by adder 414.

Subtracter circuit 416 connected at the output ports of delay elements 410 and 412 is arranged to produce negative luminance correction differences which, when added to the comb filtered luminance signal, will cancel motion induced luminance artifacts. The subtrahend and minuend connections of subtracter 416 are reversed with respect to the subtracter 318 connections of FIG. 3. Thus, the polarity of the signal in the chrominance frequency spectrum from subtracter 416 passed by filter 420 must be inverted. This polarity reversal is indicated by the small "o" at the output of filter 420. Low frequency luminance cancellation signal from filter 418 and chrominance motion cancellation signal from filter 420 are combined in adder 422, scaled by a factor of one-half and applied to adder 424. Field comb filtered luminance signal from adder 414 is scaled by a factor of one-half and applied to a second input port of adder 424 which produces normalized motion compensated luminance signal Y.

Figure 5:
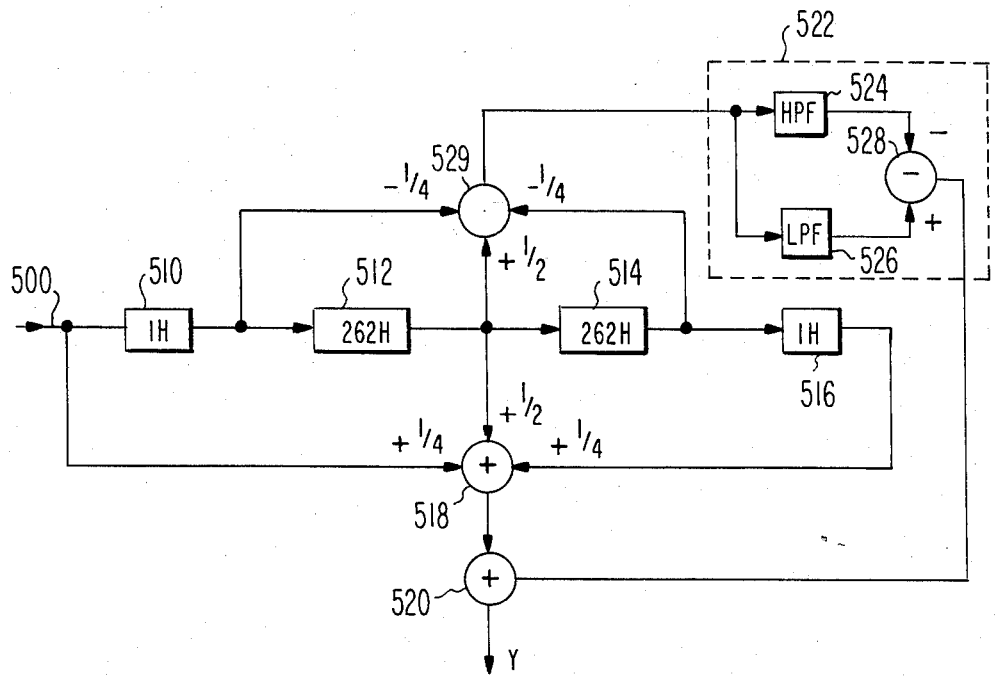

It is well known in the video signal processing arts that certain advantages may be gained by employing comb filters which use two units of delay e.g., two lines, two fields or two frames, etc. rather than a single unit of delay. FIG. 5 is one such comb filter, i.e. a two-field comb filter, and which incorporates motion compensation circuitry. The FIG. 5 system is realized by merging two of the FIG. 4 type circuits with redundant elements eliminated. Composite video signal is applied at input 500 and coupled to cascade connected delay elements 510, 512, 514 and 516. Elements 510, 512, 514 and 516 provide composite video signal delayed by one, 263, 525 and 526 line periods. Signal from the input 500 delay element 512 and delay element 516 are proportioned and combined in adder 518 to produce a normalized comb filtered luminance signal having a raised cosine frequency response.

Signal from the input and output ports of delay element 514 are subtractively combined in element 529 to develop motion correction components related to image differences between the signals corresponding to the successive fields at the output ports of delay elements 512 and 514. Signal from the input and output ports of delay element 512 are also subtractively combined in element 529 to develop motion correction components related to image differences between the signals corresponding to the successive fields at the output ports of delay element 510 and 512. The signals applied to element 529 are scaled in the same proportion as the signals applied to adder 518 such that the magnitude of the correction signal will substantially equal the magnitude of the motion induced contaminants in the comb filtered luminance signal.

Correction signals from element 529 are applied to filters 524 and 526 which respectively pass the high and low frequency portions of the frequency spectrum of the composite video signal. The high and low frequency correction components from filters 524 and 526 are subtractively combined in subtracter 528 to form a composite low frequency luminance and chrominance motion correction signal. Subtractively combining the signal from filter 524 with the signal from filter 526 provides the polarity inversion of the high frequency or chrominance correction component.

The composite correction signal from subtracter 528 and the two-field comb filtered luminance signal from adder 518 are additively combined in adder 520 to produce motion corrected luminance signal Y. It was mentioned earlier that a field comb filter produces "hanging dots", though much reduced relative to "hanging dots" produced by a line comb filter. The two field comb filter of FIG. 5, however, develops "hanging dots" which are practically non-discernable.

Figure 6A:
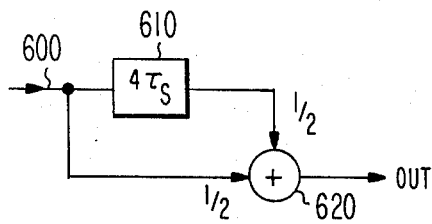
FIGS. 6A and 6B are respective block diagrams of phase reversal filter circuits which may be substituted in the FIG. 4 and 5 apparatus.
Figure 6B:
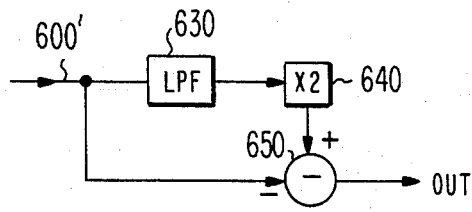

FIGS. 6A and 6B are filter circuits which may be substituted for the filter circuitry circumscribed by the broken line 450 in FIG. 4 and by the broken line 522 in FIG. 5. In FIG. 6A, the input signal applied to port 600 is presumed to be a sampled data signal occurring at a sample rate of four times the color subcarrier frequency. This signal is applied to delay element 610 and is scaled by the factor of one-half and applied to one input port of adder 620. Delayed signal from delay element 610 is scaled by one-half and applied to a second input of adder 620 which produces an output signal having an in phase low frequency component and a phase inverted high frequency component. If the delay period of delay element 610 is equal to four sample periods, phase reversal occurs at approximately 1.79 MHz.

The circuit of FIG. 6B is applicable to analog, sampled data or sampled data PCM signals. Input signal is applied at port 600' and coupled to low-pass filter 630, and the subtrahend input port of subtracter 650. Low-pass filtered signal from filter 630 is scaled by a factor of 2 in multiplier 640. The scaled low-pass filtered signal is coupled to the minuend input port of subtracter 650. The output signal from subtracter 650 is in phase for low frequencies and 180 degrees out of phase for high frequencies. Phase reversal occurs at the 3 dB cut-off frequency of the low-pass filter.

In the illustrated embodiments it may be necessary, due to the particular choice of circuit devices, to interpose compensating delays at different points in the circuitry to account for inherent processing delays of e.g., the adders and high- and low-pass filter. However, one skilled in the art of circuit design will know where and how to include such delays.

Figure 7:
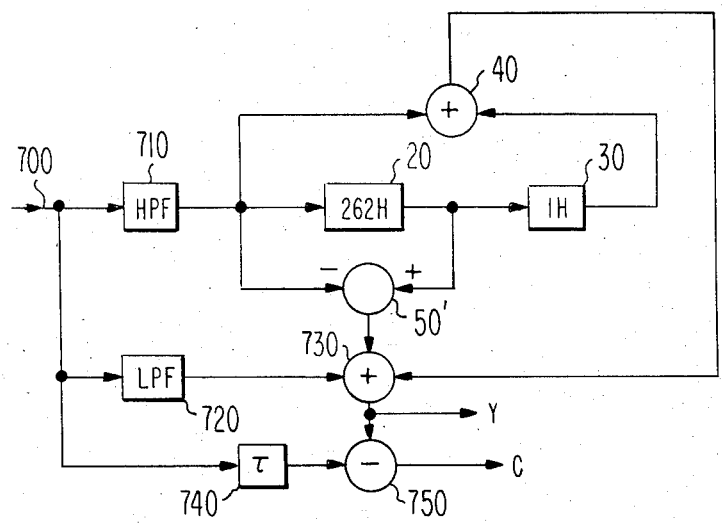

FIG. 7 is a slight variation on the FIG. 2 circuit wherein circuit elements with like numbers to circuit elements of FIG. 2 are similar. In FIG. 7 the relatively higher and lower frequency components of composite video are separated at the input and only the higher frequency components are field comb filtered to separate luminance and chrominance.

Composite video signal is applied at terminal 760 and coupled to high-pass filter 710, low-pass filter 720 and compensating delay element 740. High-pass filtered composite signal from high-pass filter 710 is applied to the luminance comb filter including delay elements 20 and 30 and adder 40 which produces high frequency luminance signal with motion induced chrominance contamination. A chrominance correction signal is developed by subtractor 50' which subtracts undelayed high-pass filtered signal from high-pass filtered signal delayed by 262 horizontal line periods.

The high frequency luminance signal from adder 40, low frequency luminance signal from low-pass filter 720 and chrominance correction signal from subtractor 50' are all combined in adder 730 to produce the luminance output signal Y. Since low frequency luminance signal is not field-comb filtered, it is unnecessary to develop a low frequency luminance correction signal.

The luminance signal Y from adder 730 is subtracted from delayed composite video signal from delay element 740 in subtracter 750 to produce separated chrominance signal C. Delay element 740 is included to temporally align the input composite video signal with the processed luminance signal, i.e. to compensate for the inherent time delays in filters 710, 720 and signal combining elements 40, 50' and 730.

What is claimed is:

1. Apparatus for separating luminance signal from composite video signal including chrominance and luminance signal components, comprising:
    an input terminal for applying composite video signal;
    signal delaying means having an input port coupled to said input terminal and having first and second output taps at which signals delayed by substantially one field period and one horizontal line period less than said substantially one field period are provided;
    first signal combining means having first and second input ports coupled to said input terminal and said first tap respectively for additively combining signals applied thereto;
    second signal combining means having first and second input ports coupled to said input terminal and said second tap for subtractively combining signals applied thereto; and
    third signal combining means having first and second input ports respectively coupled to said first and second signal combining means for additively combining signals produced thereby, and having an output port at which said luminance signal is produced.

2. The apparatus set forth in claim 1 wherein said third signal combining means is coupled to said second combining means through a filter having a transfer response which rejects chrominance signal frequencies.

3. The apparatus set forth in claim 1 further including means for separating chrominance signal from said composite signal, comprising:
    fourth signal combining means, having first and second input ports coupled to said first and second taps, for subtractively combining signals applied thereto, and having an output port at which separated chrominance signal is produced.

4. The apparatus set forth in claim 1 further including means for separating chrominance signal from said composite signal, comprising:
    a third output tap on said delaying means at which signals delayed by one horizontal line period are provided;
    a fourth signal combining means having first and second input ports respectively coupled to said input terminals and said third output tap, for subtractively combining signals applied thereto, and having an output port at which separated chrominance signal is produced.

5. A field comb filter for producing motion compensated luminance signal from composite video signal, comprising:
    means for combining said composite video and composite video signal delayed by substantially one field period to produce comb filtered luminance;
    means for subtractively combining said composite video signal and composite video signal delayed by a period one horizontal line period less than said substantially one field period to produce a difference signal; and
    means for additively combining said difference signal and said comb filtered luminance to produce at an output thereof said motion compensated luminance signal.

6. The field comb filter set forth in claim 5 wherein said substantially one field period is the duration of one field period plus the duration of one half one horizontal line.

7. Comb filter apparatus for separating luminance information from a video signal provided in field format so that image lines of each successive field are displayed interlaced with image lines from the preceding field, said comb filter comprising:
    an input terminal for applying said video signal;
    means coupled to said input terminal and having first and second output ports for providing respective signals separated by one horizontal line period and corresponding to lines of signal delayed substantially by one field period from signal applied to said input terminal, said signals from said first and second output ports corresponding to the interlace lines immediately preceding and following the signal corresponding to the image line applied to said input terminal, chrominance components of video signal from said first and second output ports being 180 degrees out of phase and the chrominance component from one of said first and second output ports being in phase with a chrominance component at said input terminal;
    first means for additively combining video signal from said input terminal and delayed signal from one of said first and second output ports having a chrominance component with a 180 degree phase relationship with video signal applied to said input terminal;
    second means for subtractively combining video signal from said input terminal and delayed signal from the other of said first and second output ports, having a chrominance component of like phase with video signal applied to said input terminal; and means for additively combining signals produced by said first and second means to produce a luminance component of said video signal.

8. A field comb filter for comb filtering video signals comprising:

a video signal input terminal;

means coupled to said input terminals for providing a first delayed video signal, said delayed video signal being separated by one field period plus one-half of one horizonal line period relative to video signal applied to said input terminal;

means coupled to said input terminals for providing a second delayed video signal, said second delayed video signal being separated from one of said input and first delayed video signal by one field period less one-half of one horizontal line period;

first combining means for additively combining video signal applied to said input terminal and said first delayed video signal to produce a non-corrected comb filtered signal;

means including a second combining means for subtractively combining said second delayed video signal and said one of said input and first delayed video signal to produce a correction signal;

filter means coupled to said second combining means for passing a band of signal frequencies normally occupied by chrominance signals;

third combining means coupled to said filter means and said first combining means for providing a comb filtered output signal.

9. The field comb filter set forth in claim 8 wherein the means including a second combining means further includes:

further filter means coupled to said second combining means for passing a band of signal frequencies not normally occupied by chrominance signal; and means coupled to said further filter means and said first combining means for combining said uncorrected comb filtered signal with signal from said further filter means, and wherein signal from said filter means and said further filter means are combined with said uncorrected comb filtered signal in opposite polarities.

10. The field comb filter set forth in claim 8 wherein said filter means includes means for inverting the polarity of signal passed by said filter means.

11. The field comb filter set forth in claim 8 wherein the means including a second combining means includes:

a further combining means for subtractively combining video signal applied to said input terminal with said first delayed video signal;

further filter means coupled to said further combining means for attenuating a band of signal frequencies normally occupied by chrominance signal; and means coupled to said further filter means and said first combining means for combining signal provided by said further filter means with said uncorrected comb filtered signal.

12. A field comb filter for comb filtering video signals comprising:

a video signal input terminal;

means coupled to said input terminal for providing a first delayed video signal, said delayed video signal being separated by one field period plus one-half of one horizontal line period relative to video signal applied to said input terminal;

means coupled to said input terminal for providing a second delayed video signal, said second delayed video signal being separated from one of said input and first delayed video signal by one field period less one-half of one horizontal line period;

first combining means for additively combining video signal applied to said input terminal and said first delayed video signal to produce a non-corrected comb filtered signal;

means including a second combining means for subtractively combining said second delayed video signal and said one of said input and first delayed video signal to produce a correction signal;

filter means coupled to said second combining means for producing a phase reversal of one of a first and second band of frequencies, said first and second bands respectively including video signal frequencies which exclude and include video signal frequencies normally occupied by chrominance signal;

third combining means coupled to said filter means and said first combining means for providing a comb filtered output signal.

13. The field comb filter set forth in claim 12 wherein said filter means includes:

delay means having input and output ports, for providing signal delayed by a period equal to the period of one cycle of a chrominance subcarrier; and means coupled to the input and output ports of said delay means for combining signal input to and output from said delay means.

* * * * *

UNITED STATES PATENT AND TRADEMARK OFFICE
CERTIFICATE OF CORRECTION

PATENT NO. : 4,636,841

DATED : Jan. 13, 1987

INVENTOR(S) : Warren H. Moles et al.

It is certified that error appears in the above-identified patent and that said Letters Patent is hereby corrected as shown below:

On the cover sheet, [75] should read as follows:

"[75] Inventors: Warren H. Moles, Flemington, N.J.;
Robert A. Dischert, Burlington Township, N.J.;
Joseph R. Ader, Yardley, P.A.".

Column 5, equation (1) should read as follows:

$$Y = S_{n+263} + S_n + (S_{n+263} - S_{n+1})$$".

Signed and Sealed this

Fifteenth Day of November, 1988

*Attest:*

DONALD J. QUIGG

*Attesting Officer*   *Commissioner of Patents and Trademarks*